(12) United States Patent
Vargantwar

(10) Patent No.: US 9,572,058 B2
(45) Date of Patent: Feb. 14, 2017

(54) INCREASING AN UPLINK PERFORMANCE IN A C-RAN ENVIRONMENT

(71) Applicant: Verizon Patent and Licensing Inc., Arlington, VA (US)

(72) Inventor: Sachin Vargantwar, Cumming, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 77 days.

(21) Appl. No.: 14/723,319

(22) Filed: May 27, 2015

(65) Prior Publication Data

US 2016/0353298 A1    Dec. 1, 2016

(51) Int. Cl.
| | | |
|---|---|---|
| H04J 3/06 | (2006.01) | |
| H04W 24/08 | (2009.01) | |
| H04W 72/04 | (2009.01) | |

(52) U.S. Cl.
CPC ......... H04W 24/08 (2013.01); H04W 72/0413 (2013.01)

(58) Field of Classification Search
CPC combination set(s) only.
See application file for complete search history.

(56) References Cited

U.S. PATENT DOCUMENTS

| | | | | |
|---|---|---|---|---|
| 8,724,551 B2 * | 5/2014 | Ohshima | ........... | H04W 36/0083 370/252 |
| 9,031,593 B2 * | 5/2015 | Liao | ........... | H04W 56/00 370/310 |
| 9,160,511 B2 * | 10/2015 | Walker | ........... | H04W 4/00 |
| 2013/0244640 A1 * | 9/2013 | Viorel | ........... | H04W 56/0005 455/422.1 |
| 2015/0056992 A1 * | 2/2015 | Morita | ........... | H04W 72/0426 455/435.1 |
| 2015/0146679 A1 * | 5/2015 | Lindoff | ........... | H04B 1/7103 370/330 |

OTHER PUBLICATIONS

Zhou et al, Analysis into Timing Advance Issue in CoMP Systems, IEEE, 5 pages, 2009.*

* cited by examiner

*Primary Examiner* — Frank Duong

(57) ABSTRACT

The instant application describes a method for identifying, at a mobile device, a first signal delay path to a first tower; identifying, at the mobile device, a second signal delay path to a second tower; determining, at the mobile device, a difference between the first signal delay path and the second signal delay path; determining, at the mobile device, whether the difference between the first signal delay path and the second signal delay path exceeds a threshold; and upon determining the difference between the first signal delay path and the second signal delay path exceeds the threshold, transmit from the mobile device two streams of a same signal to a receiver at a network. The first stream of the two streams of the same signal is transmitted at a first time, and the second stream of the two streams of the same signal is transmitted at a second time.

20 Claims, 4 Drawing Sheets

INCREASING AN UPLINK PERFORMANCE IN A C-RAN ENVIRONMENT

BACKGROUND

A Co-ordinated Radio Access Network (C-RAN) is a group of sites or nodes working in coordination in a Long-Term Evolution (LTE) network to improve network performance. One of the features of the C-RAN is Uplink Coordinated Multipoint (UL-CoMP). As a part of this feature, uplink performance of the mobile device to the network can be improved. To this end, the C-RAN type network may include multiple towers/sites and a receiver shared among the multiple towers/sites. The multiple towers/sites use their respective radio connectivity path to the mobile device to allow the mobile device to transfer the radio frequency (RF) signal to the receiver. To this end, in addition to the primary connection via the first tower/site to the mobile device, the receiver also includes a secondary connection via a second and different tower than the first tower to the mobile device. This way the receiver can receive the RF signal from the primary connection associated with the first tower and can receive the same RF signal from the secondary connection associated with the second tower and can use both signals for interference cancellation and decoding to improve uplink performance.

The limitation on the receiver side to be able to make use of connection paths provided by the multiple towers/sites is that the difference in RF time delay associated with the paths may not exceed more than the network cyclic prefix. In one specific example, the network cyclic prefix may correspond to 4.7 microseconds, which in turn corresponds to 1 km. However, the network cyclic prefix may be more or less that 4.7 microseconds in other implementation. The period defined by the network cyclic prefix is a period in which the receiver scans for incoming signal.

The limitation that the distance cannot exceed the cyclic prefix poses practicality issues because the difference in actual distance of paths can exceed 1 km. Hence, a need exists for a method to take advantage of the C-RAN network offerings even in the scenario whether the difference between the distances of the paths to multiple towers exceeds the cyclic prefix.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
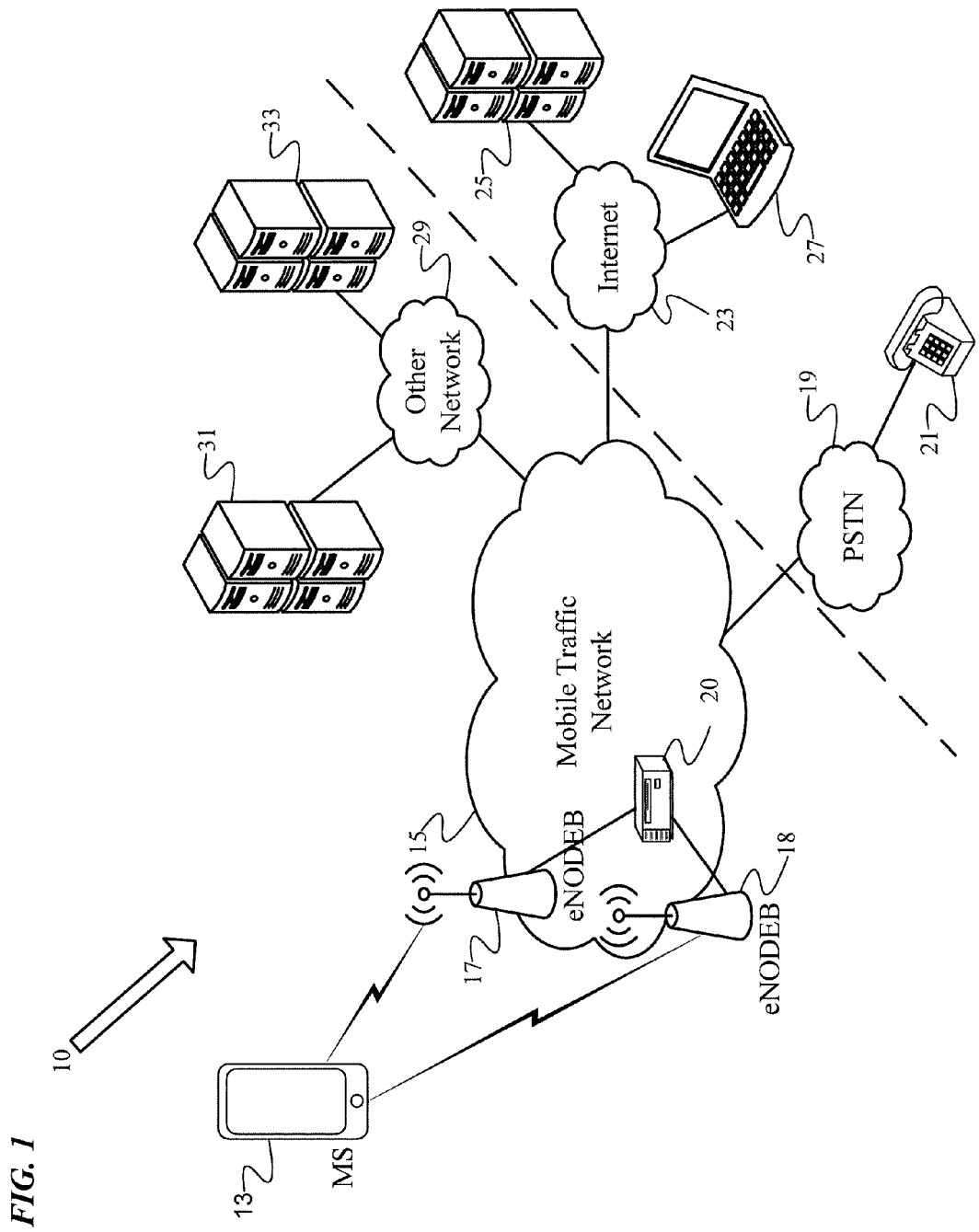
FIG. 1 is a functional block diagram describing a network, which allows a mobile device to establish multiple connections with a single receiver through multiple towers.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment for processing multiple streams of the same signal received at a receiver from multiple towers within a cyclic prefix even if the difference between the distances of the multiple towers to the mobile device exceeds the cyclic prefix. To this end, in one implementation, the mobile device may identify a first signal delay path to a first tower and a second signal delay path to a second tower. The difference between the first signal delay path and the second signal delay path may then be determined and compared to a threshold (e.g., the cyclic prefix). This difference may be measured in time or in distance. If measured in time, the difference between the first signal delay path and the second signal delay path may be compared with a time threshold (e.g., 4.7 microseconds). If measured in distance, the difference between the first signal delay path and the second signal delay path may be compared with a distance threshold (e.g., 1 km). The 4.7 microseconds and 1 km are exemplary and other network cyclic prefix may be used, which are greater or less than the 4.7 microseconds and 1 km.

If the difference between the first signal delay path and the second signal delay path does not exceed a threshold (e.g., the cyclic prefix), the mobile device may transmit a single signal which is received by the multiple towers and processed by the receiver within the cyclic prefix. However, if the difference between the first signal delay path and the second signal delay path exceeds the threshold, the mobile device may transmit two streams of a same signal to the receiver at the network. The first stream of the two steams may be transmitted at a first time and the second stream of the two streams may be transmitted at a second time. The first time may correspond to an originally scheduled time for transmission of the signal to the first tower. The originally scheduled time may be advanced from a time the first tower expects to receive the signal to account for a propagation time delay between the mobile device and the first tower. The second time may be advanced from the first time such that one of the RF signals from the first stream transmission and one of the RF signals from the second stream transmission arrive at the receiver at substantially the same time or within the required cyclic prefix.

In another implementation, before transmitting two streams of the same RF signal to the receiver, the mobile device may check its battery level to determine if the battery level is less than a threshold level. If the battery level is above a threshold level, the mobile device may proceed to transmit two streams of the same RF signal as outlined above. If the battery level is below the threshold level, the mobile device may transmit a single stream of the RF signal to a network at a time offset from an original time for transmitting the RF signal. The original time may correspond to a timing advance provided by the network. The timing advance may inform the mobile device to transmit the RF signal in advance of a time the network expects to receive the RF signal to account for a propagation time delay associated with the signal traveling from the mobile device to the tower. In this scenario, even though the RF signal does not reach the towers within the tower expected time, the RF signal may still be picked up by the towers if it falls within their respective search window. The search window may correspond to a window within which the tower searches for the RF signal. For example, the search window may be 10 minutes and the expected time for receiving the signal may fall anywhere within this window (e.g., at the beginning, at the middle, at the end). In order to process the RF signals, in one implementation, the receiver may still have to receive the RF signals within the network cyclic prefix. That is, the RF signals should be received both within the search window and within the network cyclic prefix. In another implementation, the receiver may process the received RF signals as long as they are both received within the search window of the towers.

Reference now is made in detail to the examples illustrated in the accompanying drawings and discussed below. FIG. 1 is a functional block diagram describing a network 10 for processing multiple streams of the same signal received at a receiver from a mobile device through multiple towers.

The example shows simply a mobile device (MS) 13 as well as a mobile communication network 15. The station 13 is an example of a mobile device that may be used for an Uplink Coordinated Multipoint (UL-CoMP) service provided by the network 10. As a part of UL-CoMP service different towers within the network 15 can use the receive path of the mobile device and provide diversity path to a receiver within the network 15 in addition to the one coming from the primary.

The network 15 provides mobile wireless communication services to MS 13 as well as to other mobile devices (not shown), for example, via a number of towers 17 and 18. The towers 17 and 18 may be an eNODEB towers. The towers 17 and 18 may inform the MS 13 of the time the towers 17 and 18 each expect to receive the RF signal from the MS 13. The towers 17 and 18 may also inform the MS 13 of a timing advance associated with each tower. The timing advance may inform the MS 13 to transmit the RF signal in advance of a time the tower expects to receive the RF signal to account for the propagation time delay associated with the RF signal traveling from the MS 13 to the tower. To this end, the tower 17 may have a first timing advance and the tower 18 may a second timing advance. The first and second timing advance may be the same as each other or different from each other. For example, the first timing advance may be less than the second timing advance since the distance of the mobile device to the first tower is closer than the distance of the mobile device to the second tower as shown in FIG. 1.

In another implementation, the towers 17 and 18 may provide the MS 13 with the time the towers 17 and 18 expect to receive the RF signal and the MS 13 may determine the timing advance to each of the towers 17 and 18. For example, the MS 13 may identify a first travel distance for a signal traveling from the MS 13 to the first tower 17. The MS 13 may also identify a second travel distance for the signal traveling from the MS 13 to the second tower 18. The MS 13 may determine a first travel time for a signal traveling from the MS 13 to the tower 17 and a second travel time for the signal traveling from the MS 13 to the tower 18. The first travel time may correspond to the first timing advance and the second travel time may correspond to the second timing advance.

The location of the MS 13 may be determined via Global Positioning System (GPS) on the MS 13. Alternatively, the location of the MS 13 may be determined via other location based services such as triangulation. The location of the towers 17 and 18 may be previously stored in the MS 13. Alternatively, each tower may broadcast its location to the MS 13.

The network 10 also includes a receiver 20 for receiving the RF signals from the towers 17 and 18. As shown, the receiver 20 may be shared among the towers 17 and 18. Alternatively, each tower may have its own dedicated receiver 20. If the receiver 20 is shared among the towers 17 and 18, the receiver 20 may perform a coordinated processing. The coordinate processing may increase uplink performance of the network. In this scenario, multiple towers 17 and 18 are listening to the RF signal from the MS 13 and pass the RF signal to the receiver 20 for decoding. The receiver 20, by taking a sample of the RF signal from the tower 17 and a sample of the RF signal from the tower 18, can use both signals to correlate and find the best possible information. To this end, the receiver 20 may be able to improve the uplink performance of the network 10.

However, the receiver 20 may have a limitation such that the sample of the RF signal from the towers 17 and 18 should arrive at the receiver 20 within a specific threshold. The threshold may be a cyclic prefix time or a cyclic prefix distance set by the network. The cyclic prefix time may be 4.7 microseconds, which means the difference in signal travel time from the MS 13 to the tower 17 and signal travel time from the MS 13 to the tower 18 may not exceed 4.7 microseconds. The cyclic prefix time may be different in urban areas than in the suburban areas. For example, in urban areas the cyclic prefix time may be longer than the cyclic prefix time in the suburban areas due to the high raises in the urban area. The cyclic prefix time of 4.7 microseconds corresponds to the cyclic prefix distance of 1 km. This means that the difference between the travel distance for the signal traveling from the MS 13 to the tower 17 and the travel distance for the signal traveling from the MS 13 to the tower 18 may not exceed 1 km.

To design around the specific threshold set by the network, the MS 13 may transmit multiple streams of the same RF signals at different timing. One of the multiple streams may be transmitted at a first time advanced from the time the tower 17 expects to receive the signal from the MS 13 to account for a propagation time delay between the MS 13 and the tower 17. The other of the multiple streams may be transmitted at a second time advanced from the first time by a time associated with the difference between the signal travel time from the MS 13 to the tower 17 and the signal travel time from the MS 13 to the tower 18. This may ensure that both streams of the signal arrive at the receiver 20 within the specific threshold even if the difference between the travel distance for the signal traveling from the MS 13 to the tower 17 and the travel distance for the signal traveling from the MS 13 to the tower 18 exceeds 1 km.

In another implementation, before transmitting multiple streams of the RF signal to work around the specific threshold set by the network, the MS 13 may check the battery level of the MS 13 to determine if the battery level is less than a threshold level. If the battery level is above a threshold level, the MS 13 may proceed in transmitting two streams of the same signal as outlined above. If the battery level is below the threshold level, the MS 13 may transmit a RF signal to the network 15 at a time offset from an original time for transmitting the RF signal. The original time may correspond to a first timing advance provided to the MS 13 by the tower (e.g., tower 17). The first timing advance may inform the MS 13 to transmit the RF signal in advance of a time the tower 17 expects to receive the RF signal to account for a first propagation time delay associated with the signal traveling from the MS 13 to the tower 17. The time offset is between the original time and a second timing advance provided to the MS 13 by the tower (e.g., tower 18). The second timing advance may inform the MS 13 to transmit the RF signal in advance of the time the tower 18 expects to receive the RF signal to account for a second propagation time delay associated with the signal traveling from the MS 13 to the tower 18. In this manner, the signal may be received within a search window of each tower and may be processed by the receiver 20 within the cyclic prefix time.

Referring again to FIG. 1, the present techniques may be implemented in any of a variety of available mobile networks 15 and/or on any type of mobile device compatible with such a network 15, and the drawing shows only a very simplified example of a few relevant elements of the network 15 for purposes of discussion here. The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The MS 13 may are capable of voice telephone communications through the network 15, and for the UL-CoMP services, the exemplary MS 13 is capable of data communications through the particular type of network 15 (and the users thereof typically will have subscribed to data service through the network).

The network 15 allows users of the mobile devices such as 13a and 13b (and other mobile devices not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the MS 13 via the Internet 23 may be with devices like those shown at 25 and 27 as well as with a variety of other types of devices or systems capable of data communications through various interconnected networks. The MS 13 of users of the UL-CoMP service also can receive and execute applications written in various programming languages, as later discussed.

The MS 13 can take the form of portable handsets, smart-phones or personal digital assistants, although they may be implemented in other form factors. Program applications, including an application to assist in the UL-CoMP can be configured to execute on many different types of MS 13. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving MS 13, can include one or more RANs and a regional circuit and/or packet switched network and associated signaling network facilities.

Physical elements of a RAN operated by one of the mobile service providers or carriers, include a number of eNODEB represented in the example by the eNODEBs 17 and 18. Although not separately shown, such an eNODEB can include a base transceiver system (BTS), which can communicate via an antennae system at the site of eNODEB and over the airlink with one or more of the MS 13, when the MS 13 is within range.

The radio access networks can also include a traffic network represented generally by the cloud at 15, which carries the user communications and data for the MS 13 between the eNODEB 17 and 18 and other elements with or through which the MS 13 communicate. The network 15 can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

The MS 13 communicates over the air with the eNODEB 17 and 18 and through the traffic network 15 for various voice and data communications, e.g. through the Internet 23 with a server 25 and/or with application servers 31. Server such as 25 and 31 may provide any of a variety of common application or service functions in support of or in addition to an application program running on the MS 13. For a given service, including the UL-CoMP service, an application program within the mobile device 13 may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile device 13, the server application provides appropriate information to the authentication server 33 to allow server application 33 to authenticate the mobile device 13 as outlined herein. Upon successful authentication, the server 33 informs the server application 31, which in turn provides access to the service via data communication through the various communication elements (e.g. 29, 15 and 17) of the network 10. A similar authentication function may be provided via the server 25, either by the server 33 if there is an appropriate arrangement between the carrier and the operator of server 24, by a program on the server 25 or via a separate authentication server (not shown) connected to the Internet 23.

Figure 2:
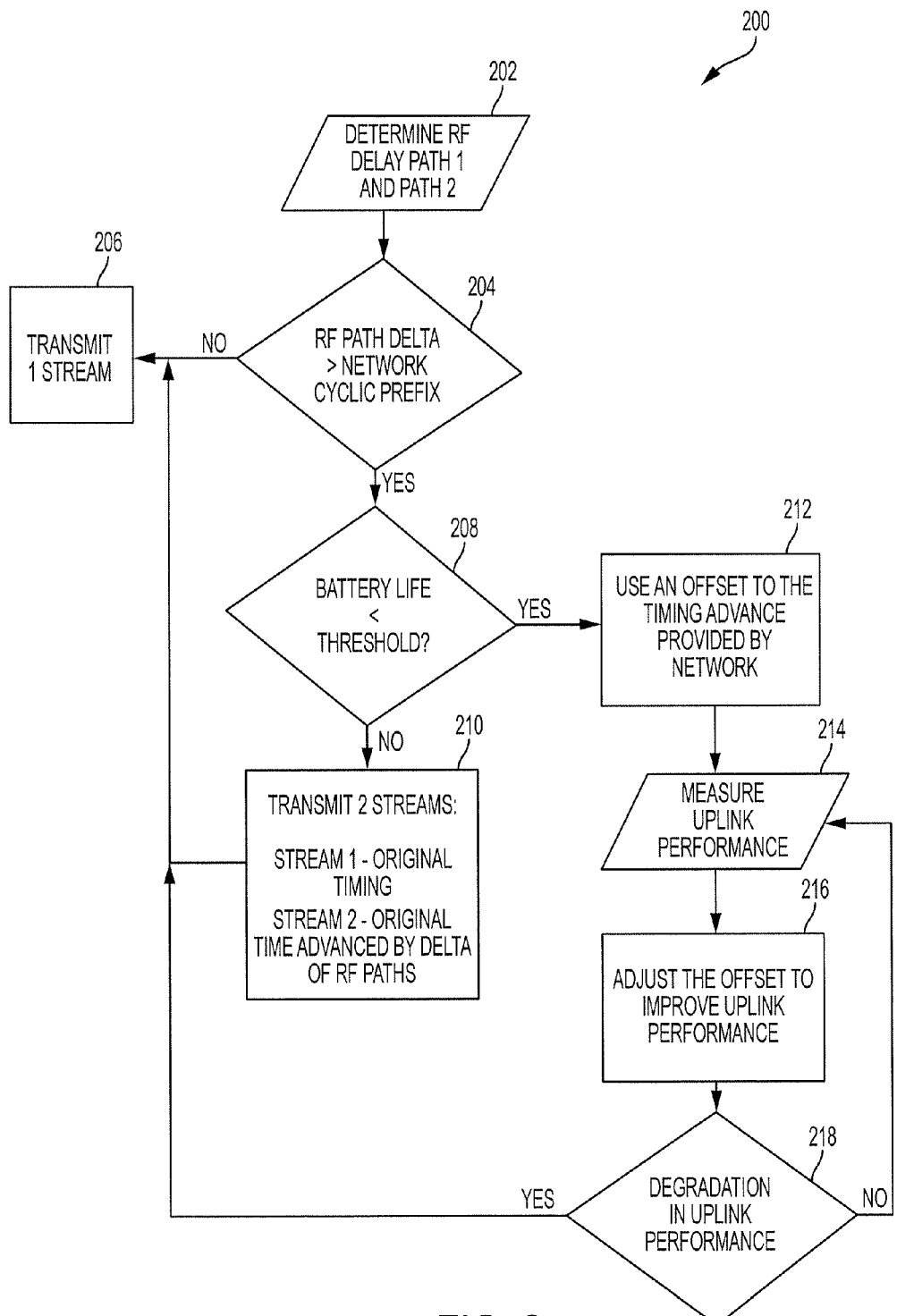
FIG. 2 illustrates an exemplary process 200 for increasing an uplink performance of the mobile device in the C-RAN environment even if the difference between the distances of the mobile device to multiple towers shown in FIG. 1 exceeds a network cyclic prefix.

FIG. 2 illustrates an exemplary process 200 for increasing an uplink performance of the mobile device in the C-RAN environment even if the difference between the distances of the mobile device to multiple towers exceeds the cyclic prefix. In keeping with the previous example, the process 200 is described with respect to MS 13, towers 17 and 18, and the receiver 20 described in detail with respect to FIG. 1.

The exemplary process 200 includes the MS 13 identifying the first signal delay path and the second signal delay path (Step 202). To identify the first signal delay path and the second signal delay path, the MS 13 may identify a first travel distance for a signal traveling from the MS 13 to the tower 17 and a second travel distance for the signal traveling from the mobile device to the tower 18. The first travel distance may be identified based on the location of the MS 13 and the location of the tower 17. The second travel distance may be identified based on the location of the MS 13 and the location of the tower 18. The location of the MS 13 may be determined via GPS on the MS 13. Alternatively, the location of the MS 13 may be determined via other location based services such as triangulation. The location of the towers 17 and 18 may be previously stored in the MS 13. Alternatively, each tower may broadcast its location to the MS 13. Upon identifying the first and second travel distances, the MS 13 may then determine a first travel time for a signal traveling the first travel distance and a second travel time for a signal traveling the second travel distance.

In another implementation, the MS 13 may identify the first and second signal delay paths based on the information received from the towers 17 and 18. For example, the tower 17 may inform the MS 13 of the time it expects to receive a signal from the MS 13 and of a first propagation time delay associated with receiving the signal from the MS 13 at the tower 17. Similarly, the tower 18 may inform the MS of the time it expects to receive a signal from the MS 13 and a second propagation time delay associated with receiving the signal from the MS 13 at the tower 18.

Upon identifying the first signal delay path and the second signal delay path, the MS 13 may determine the difference between the first and second signal delay paths. The difference between the first and second signal delay paths may be measured in time or distance. For example, when the MS 13 identifies the first and second signal delay paths to be respectively first and second travel distances for a signal traveling from the MS 13 to the towers 17 and 18, the difference may be measured in distance. In another example, when the MS 13 identifies the first and signal delay paths to be respectively first and second travel times for a signal traveling from the MS 13 to the towers 17 and 18, the difference may be measured in time.

The MS 13 difference between the first and second delay signal paths (e.g., RF path delta) exceeds the network cyclic prefix (Step 204). In keeping with the previous example, the network cyclic prefix may be set to be 4.7 microseconds. Alternatively, the network cyclic prefix may be set to 1 km. The difference between the first and second delay signal paths, depending on whether it is measured in time or distance, is compared with either the time network cyclic prefix or the distance network cyclic prefix. In either case, upon determining that the difference between the first and second delay signal paths does not exceed the network cyclic prefix (Step 204, No), the MS 13 transmits a single RF signal (Step 206). The RF signal is received by the towers 17 and 18 and forwarded to the receiver 20. Since the receiver 20 receives the signals from the towers 17 and 18 within the network cyclic prefix from each other, the receiver 20 can process both signals to correlate and find the best possible information.

Upon determining that the difference between the first and second delay signal paths exceeds the network cyclic prefix (Step 204, Yes), the MS 13 may optionally determine whether the battery level of the MS 13 is less than a threshold level (Step 208). If the battery level of the MS 13 is not less than the threshold level (Step 208, No), the MS 13 transmits two streams of the same RF signal to the receiver 20 at the network (Step 210). The first stream of the two streams may be transmitted at a first time and the second stream of the two streams may be transmitted at a second time. The first time may be an original time for transmission of the signal and the second time may be the original time advanced by the difference between the first and second signal delay paths (e.g., the delta RF paths). The original time may be a time advanced from the time the tower 17 expects to receive the signal from the MS 13 to account for the propagation time delay between the MS 13 and the tower 17. By sending the second stream, advanced in time, this signal may reach the receiver 20 within the network cyclic prefix.

In this manner, the receiver 20 may receive four copies of the same signal (e.g., two copies transmitted from the MS 13 at the first time and received at the receiver 20 through the towers 17 and 18 and two copies transmitted from the MS 13 at the second time at the receiver 20 through the towers 17 and 18). Out of the four copies of the RF signal received at the receiver 20, two of the copies may be received at the receiver 20 within the network cyclic prefix and may be used for processing and increasing the uplink performance.

To illustrate one specific example, assume it takes 10 minutes for the signal to travel from the MS 13 to the tower 17 and it takes 20 minutes for the signal to travel from the MS 13 to the tower 18. The foregoing travel times are exemplary and are used for ease of reference and understanding. The actual travel time of the signal may be significantly faster than the time used in this specific example. For example, the actual travel time may be in milliseconds. Moving forward, further assume that the first and second towers both expect to receive the signal at 10 minutes past the hour mark (e.g., 12:10, 1:10, 2:10, 3:10, etc.). The towers 17 and 18 may inform the MS 13 of the time they expect to receive the signal from the MS 13. Furthermore, the towers 17 and 18 may inform the MS 13 of the propagation time delay for signal to travel from the MS 13 to respective towers 17 and 18. Alternatively, the MS 13 may determine the propagation time delay for signal to travel from the MS 13 to respective towers 17 and 18 based on location of the towers 17 and 18 and the location of the MS 13. In either case and in keeping with the previous example, the MS 13 may determine that it takes 10 minutes for the signal to reach the tower 17 and it takes 20 minutes for the signal to reach tower 18. Since the difference between the travel time (e.g., 10 minutes) is more than the network cyclic prefix (e.g., 4.7 microseconds), the MS 13 may choose to transmit two streams of the same signal to the receiver 20. The first stream may be transmitted at the original timing of 3:00 pm to arrive at the tower 17 at 3:10 and arrive at the tower 18 at 3:20. The second stream may be transmitted in advance of the original timing 3:00 by the difference between the travel time (e.g., 10 minutes). That is, the second stream may be transmitted at 2:50 and as such may arrive at the tower 17 at 3:00 and at the tower 18 at 3:10. In this manner, the receiver 20 can use the first signal that is received at the tower 17 located closer to MS 13 and the second signal that is received at the tower 18 located farther from the MS 13 for processing since they are both received within the network cyclic prefix. The remaining signals received at the receiver 20 may be ignored. To this end, even if the difference in an actual distance of the paths between the towers to the MS 13 exceeds the 1 km threshold, the MS 13 can still take advantage of the features of the UL-CoMP service.

As noted above, the MS 13 may optionally determine whether the battery level of the MS 13 is below the threshold level (Step 208). If it is determined that the battery level of the MS 13 is below the threshold level (Step 208, Yes), the MS 13 may transmit a single stream of the RF signal instead of multiple streams of the RF signal at a time offset from the timing advance provided by the network in sending a single RF signal (Step 212). The timing advance may be an original time provided by the network (e.g., the tower 17 or the tower 18) to the MS 13 to inform the MS 13 to transmit the RF signal in advance of a time the network (e.g., the tower 17 or the tower 18) expects to receive the RF signal. For example, depending on their respective distances to the MS 13, the towers 17 and 18 may each provide the MS 13 with a different timing advance. In keeping with the previous example, where the MS 13 is located closer to the tower 17 than the tower 18, the timing advance to the tower 17 may be 10 minutes and the timing advance to the tower 18 may be 20 minutes from the time the towers expect to receive the RF signal (e.g., 3:10). In another implementation, the MS 13 determines the timing advance to the towers 17 and 18 based on the information the MS 13 receives from the network, such as, for example, the locations of the towers 17 and 18. This alternative was described above and therefore is not described here in more detail for sake of simplicity of brevity of description.

The time offset may be between a first time for transmitting the signal to the tower 17 and a second time for transmitting the signal to the tower 18. In keeping with the previous example, where the timing advance to the tower 17 is 10 minutes and the timing advance to the second tower 18 is 20 minutes, the first time may be 3:00 and the second time may be 2:50 and the time offset may be 2:55. To this end, the signal may arrive at the first signal at the tower 17 at 3:05 and may arrive at the second tower 18 at 3:15. Alternatively, the first signal may arrive at the first tower 17 and the second tower 18 sooner or later than expected depending on the location of the mobile device. For example, the travel time may be estimated to be 10 minutes to the first tower 17, however, the mobile device may be in an urban area with many buildings blocking the signal. As such, the actual travel time may be longer than estimated travel time of 10 minutes and may instead be 20 minutes.

Although the RF signal does not reach the towers 17 and 18 within the expected time (e.g., 3:10), the RF signal may still be picked up by the towers 17 and 18 if the RF signal falls within a search window of the towers 17 and 18. The search window may correspond to a window within which the tower searches for the RF signal. For example, the search window may be 10 minutes and the expected time for receiving the signal may fall anywhere within this window (e.g., at the beginning, at the middle, at the end). For example, the expected time may fall at the middle of the search window in which case the search window provides coverage for RF signal received 5 minutes prior to the time the tower expects to receive signal and 5 minutes after the time the tower expects to receive signal. Therefore, by sending the signal at 2:55, both towers may receive the signal within the search window and may pass the signal to the receiver 20 for processing. In order to process the RF signals, in one implementation, the receiver 20 may still have to receive the RF signals within the network cyclic prefix. That is, the RF signals should be received both within the search window and within the network cyclic prefix.

Following setting the time offset, the uplink performance may be measured (Step 214). The MS 13 may perform uplink performance based on the number of retransmissions it has to do on its uplink transmissions. If the measured uplink performance is within an acceptable threshold, the time offset may be maintained. If the measured uplink performance is not within an acceptable threshold, the MS 13 may adjust the time offset to improve the uplink performance (Step 216). In keeping with the previous example, the MS 13 may move the offset timing from 2:55 closer to 3:00 (timing advance to the tower 17) or closer to 2:50 (the timing advance to the tower 18). After adjustment of the timing offset, the degradation in uplink performance may be measured (Step 218). If the uplink performance has further degraded (Step 218, Yes), the MS 13 may forgo the timing offset alternative and may transmit a single RF signal at the original timing. For example, in keeping with the previous example, the MS 13 may send a single RF signal at 3:00 to arrive at the tower 17 at 3:10. If the uplink performance has not further degraded (Step 218, No), the process continues in performing steps 214, 216, and 218 for next RF transmission from the MS 13.

In one implementation, if the difference between the first signal delay path and the second signal delay path is substantially larger than the search window provided by the tower and if the battery level is lower than the threshold level, the MS 13 may not determine an offset to the timing advance provided by the network and may transmit a single RF signal at the original timing to the network.

The process for increasing an uplink performance of the mobile device in the C-RAN environment under consideration here may be delivered to touch screen type mobile devices as well as to non-touch type mobile devices. Our simple example, however, shows the MS 13 as a touch screen type mobile device. Implementation of the process for increasing an uplink performance of the mobile device in the C-RAN environment will involve at least some execution of programming in the mobile devices as well as implementation of user input/output functions and data communications through the network 15, from the mobile devices.

Those skilled in the art presumably are familiar with the structure, programming and operations of the various type of mobile devices. However, for completeness, it may be useful to consider the functional elements/aspects of two exemplary mobile devices 13a and 13b, at a high-level.

Figure 3:
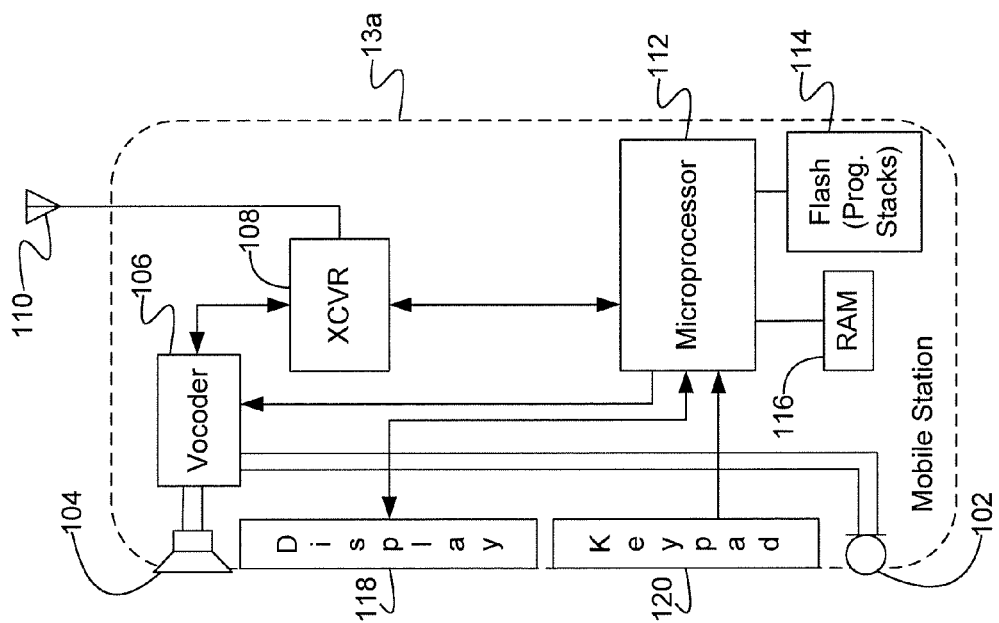
FIG. 3 is a high-level functional block diagram of an exemplary non-touch type mobile device that may utilize the process for increasing the uplink performance in the C-RAN environment shown in FIG. 2 through a network/system like that shown in FIG. 1.

For purposes of such a discussion, FIG. 3 provides a block diagram illustration of an exemplary non-touch type mobile device 13a. Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc., including information for increasing an uplink performance of the mobile device in the C-RAN environment service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed for increasing an uplink performance of the mobile device in the C-RAN environment.

A microprocessor 112 serves as a programmable controller for the mobile device 13a, in that it controls all operations of the mobile device 13a in accord with programming that it executes, for all normal operations, and for operations involved in the UL-CoMP procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for increasing an uplink performance of the mobile device in the C-RAN environment.

Figure 4:
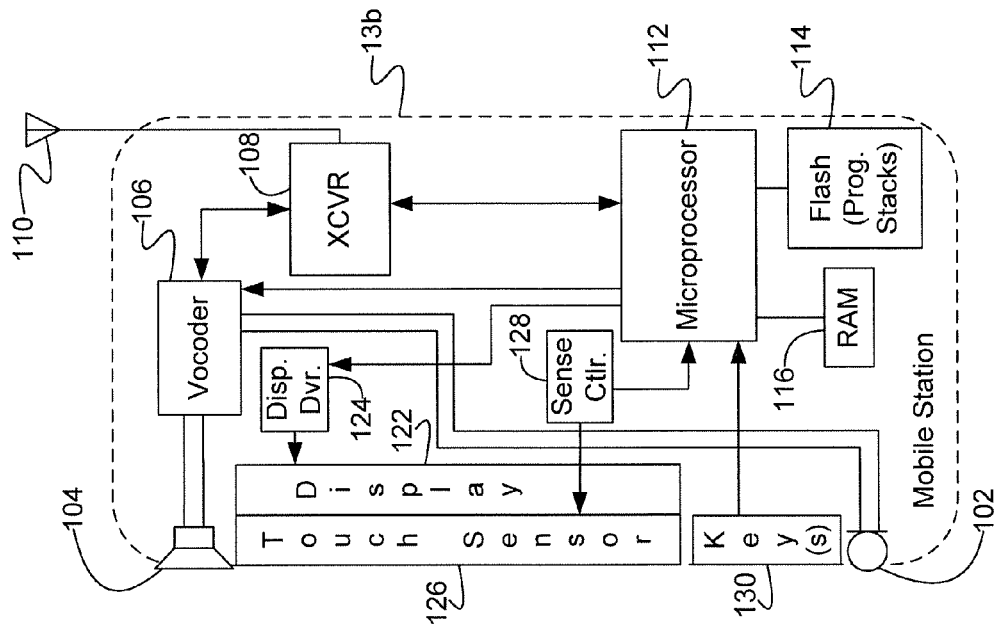
FIG. 4 is a high-level functional block diagram of an exemplary touch screen type mobile device that may utilize the process for increasing the uplink performance in the C-RAN environment shown in FIG. 2 through a network/system like that shown in FIG. 1.

For purposes of such a discussion, FIG. 4 provides a block diagram illustration of an exemplary touch screen type mobile device 13b. Although possibly configured somewhat differently, at least logically, a number of the elements of the exemplary touch screen type mobile device 13b are similar to the elements of mobile device 13a, and are identified by like reference numbers in FIG. 4. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile device 13b, in that it controls all operations of the mobile device 13b in accord with programming that it executes, for all normal operations, and for operations involved in increasing an uplink performance of the mobile device in the C-RAN environment under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, outlined above, the mobile device 13b includes a processor, and programming stored in the flash memory 114 configures the processor so that the mobile device is capable of performing various desired functions, including in this case the functions involved in the technique for increasing an uplink performance in the C-RAN environment.

In the example of FIG. 4, the user interface elements included a display and a keypad. The mobile device 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 13b includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provide touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output, including with respect functions relating to increasing an uplink performance of the mobile device in the C-RAN environment.

The structure and operation of the mobile devices 13a and 13b, as outlined above, were described to by way of example, only.

In one general aspect, the instant application describes a method that includes steps of identifying, at a mobile device, a first signal delay path to a first tower; identifying, at the mobile device, a second signal delay path to a second tower; determining, at the mobile device, a difference between the first signal delay path and the second signal delay path; determining, at the mobile device, whether the difference between the first signal delay path and the second signal delay path exceeds a threshold; and upon determining the difference between the first signal delay path and the second signal delay path exceeds the threshold, transmit from the mobile device two streams of a same signal to a receiver at a network. The first stream of the two streams of the same signal is transmitted at a first time, and the second stream of the two streams of the same signal is transmitted at a second time.

The above general aspects may include one or more of the following features. Identifying the first signal delay path may include identifying a first travel distance for a signal traveling from the mobile device to the first tower. Identifying the second signal delay path may include identifying a second travel distance for the signal traveling from the mobile device to the second tower. Determining whether the difference between the first signal delay path and the second signal delay path exceeds the threshold may include determining whether a difference between the first travel distance and the signal travel distance is greater than a predetermined distance threshold.

Identifying the first signal delay path may include identifying a first travel time for a signal traveling from the mobile device to the first tower. Identifying the second signal delay path may include identifying a second travel time for the signal traveling from the mobile device to the second tower. Determining whether the difference between the first signal delay path and the second signal delay path exceeds the threshold may include determining whether a difference between the first travel time and the second travel time is greater than a predetermined time threshold. The first and second towers may be eNodeB towers associated with a Long-Term Evolution ("LTE") network and share a common receiver. The threshold may include 1 km. The threshold may include 4.7 μseconds.

The method may further include receiving from the first tower a time the first tower expects to receive a signal from the mobile device and a first propagation time delay associated with receiving the signal from the mobile device at the first tower; and receiving from the second tower a time the second tower expects to receive the signal from the mobile device and a second propagation time delay associated with receiving the signal from the mobile device at the second tower. Identifying the first signal delay path may include identifying the first propagation time delay received from the first tower. Identifying the second signal delay path may include identifying the second propagation time delay received from the second tower. Determining whether the difference between the first signal delay path and the second signal delay path exceeds the threshold may include determining whether the difference between the first propagation time delay and the second propagation time delay exceeds the threshold. Transmitting two streams of a same signal may include transmitting two streams of the same signal upon determining the difference between the first propagation time delay and the second propagation time delay exceeds the threshold.

The first stream of the two streams of the same signal may be transmitted at the first time in advance of the time the first tower expects the signal. The first time may be advanced from the time the first tower expects the signal to account for the first propagation time delay. The second stream of the two streams of the same signal may be transmitted at the second time in advance of the time the second tower expects the signal. The second time may be advanced from the time the second tower expects the signal to account for the second propagation time delay.

The first stream of the two streams of the same signal is transmitted at the first time. The first time may be advanced from the time the first tower expects the signal to account for the first propagation time delay. The second stream of the two streams of the same signal may be transmitted at the second time. The second time may be advanced from the first time by the difference between the first propagation time delay and the second propagation time delay.

The method may further include receiving from the first tower a time the first tower expects to receive a signal from the mobile device and a first location associated with the first tower, and receiving from the second tower a time the second tower expects to receive the signal from the mobile device and a second location associated with the second tower. Identifying the first signal delay path may include identifying a first distance between the mobile device and the first tower based on the location of the mobile device and the first location of the first tower. Identifying the second signal delay path may include identifying a second distance between the mobile device and the second tower based on the location of the mobile device and the second location of the first tower. Determining whether the difference between the first signal delay path and the second signal delay path exceeds the threshold may include determining whether the difference between the first distance and the second distance exceeds the threshold. Transmitting two streams of the same signal may include transmitting two streams of the same signal upon determining the difference between the first distance and the second distance exceeds the threshold.

The first stream of the two streams of the same signal may be transmitted at the first time. The first time may be advanced from the time the first tower expects the signal to account for a time needed for the signal to travel the first distance. The second stream of the two streams of the same signal may be transmitted at the second time. The second time may be advanced from the first time by a time needed for the signal to travel a distance corresponding to the difference between the first distance and the second distance. The second stream of the two streams of the same signal may be transmitted at the second time in advance of the first time such that the two streams arrive at the receiver at substantially a same time. The first stream of the two streams of the same signal may be transmitted in advance of a time the first tower expects to receive the signal to account for a propagation time delay between the mobile device and the first tower. The second stream of the two streams of the same signal may be transmitted at the second time in advance of the first time such that the two streams arrived at a receiver within a network threshold time. The second stream of the two streams of the same signal may be transmitted at the second time advanced from the first time by a time associated with the difference between the first signal delay path and the second signal delay path.

In another general aspect, the instant application describes a method including steps of identifying, at a mobile device, a first signal delay path to a first tower; identifying, at the mobile device, a second signal delay path to a second tower; determining, at the mobile device, a difference between the first signal delay path and the second signal delay path; determining, at the mobile device, whether the difference between the first signal delay path and the second signal delay path exceeds a threshold; and upon determining the difference between the first signal delay path and the second signal delay path exceeds the threshold, determining whether a battery level associated with the mobile device is less than a threshold level; and upon determining the battery level associated with the mobile device is less than the threshold level, transmitting a radio frequency signal from the mobile device to a network at a time offset from an original time for transmitting the radio frequency signal.

The above general aspect may include one or more of the following features. The original time may correspond to a first timing advance provided by the network informing the mobile device to transmit the radio frequency signal in advance of a time the network expects to receive the radio frequency signal to account for a first propagation time delay associated with the signal traveling from the mobile device to the first tower. The time offset may be between the original time and a second time advance provided by the network informing the mobile device to transmit the radio frequency signal in advance of the time the network expects to receive the radio frequency signal to account for a second propagation time delay associated with the signal traveling from the mobile device to the second tower.

Identifying the first signal delay path may include identifying a first travel time for a signal traveling from the mobile device to the first tower. Identifying the second signal delay path may include identifying a second travel time for the signal traveling from the mobile device to the second tower. Determining whether the difference between the first signal delay path and the second signal delay path exceeds the threshold may include determining whether a difference between the first travel time and the second travel time is greater than a predetermined travel threshold.

The method may further include steps of measuring an uplink performance associated with the signal transmitted from the mobile device to the network; determining whether the uplink performance is within an acceptable threshold; and upon determining that the uplink performance is not within the acceptable threshold, adjusting the time offset from the original time to improve the uplink performance.

As shown by the above discussion, functions relating to increasing an uplink performance of the mobile device in the C-RAN environment, via a graphical user interface of a mobile device may be implemented on computers connected for data communication via the components of a packet data network, operating as a receiver shown in FIG. 1. Although special purpose devices may be used, such devices also may be implemented using one or more hardware platforms intended to represent a general class of data processing device commonly used to run "server" programming so as to implement the receiver functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for increasing an uplink performance of the mobile device in the C-RAN environment. The software code is executable by the general-purpose computer that functions as the mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for increasing an uplink performance of the mobile device in the C-RAN environment, in essentially the manner performed in the implementations discussed and illustrated herein.

Figures 5, 6:
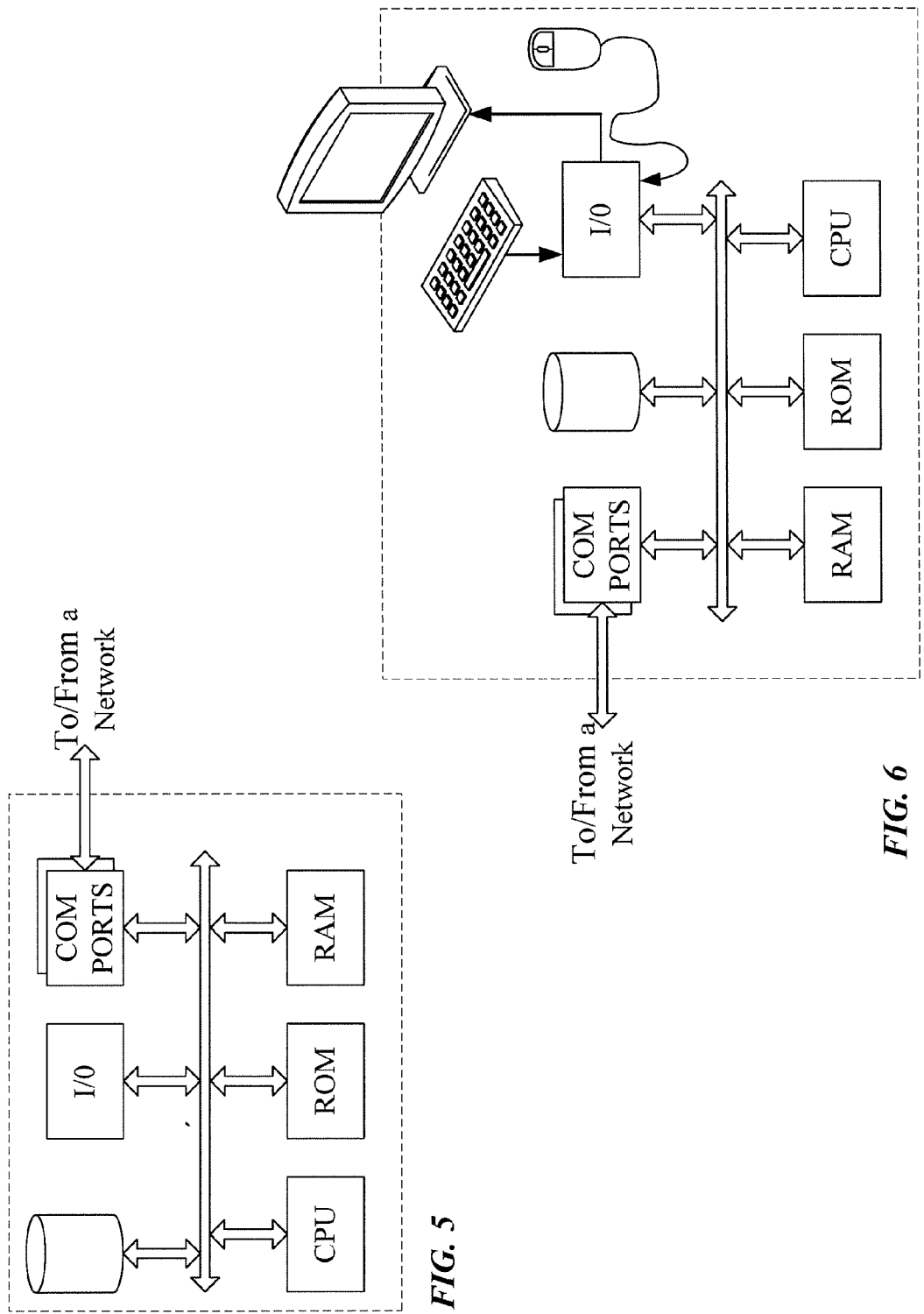
FIG. 5 is a simplified functional block diagram of a computer that may be configured to function as any of the devices of FIG. 1.
FIG. 6 is a simplified functional block diagram of a personal computer or other work station or terminal device that may be configured to function as any of the devices of FIG. 1.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of increasing an uplink performance of the mobile device in the C-RAN environment outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the procedure for increasing an uplink performance of the mobile device in the C-RAN environment, shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   identifying, at a mobile device, a first signal delay path to a first tower;
   identifying, at the mobile device, a second signal delay path to a second tower;
   determining, at the mobile device, a difference between the first signal delay path and the second signal delay path;
   determining, at the mobile device, whether the difference between the first signal delay path and the second signal delay path exceeds a threshold; and
   upon determining the difference between the first signal delay path and the second signal delay path exceeds the threshold, transmit from the mobile device two streams of a same signal to a receiver at a network, wherein:
   a first stream of the two streams of the same signal is transmitted at a first time, and
   a second stream of the two streams of the same signal is transmitted at a second time.

2. The method of claim 1, wherein:
   identifying the first signal delay path includes identifying a first travel distance for a signal traveling from the mobile device to the first tower,
   identifying the second signal delay path includes identifying a second travel distance for the signal traveling from the mobile device to the second tower, and
   determining whether the difference between the first signal delay path and the second signal delay path exceeds the threshold includes determining whether a difference between the first travel distance and the signal travel distance is greater than a predetermined distance threshold.

3. The method of claim 1, wherein:
   identifying the first signal delay path includes identifying a first travel time for a signal traveling from the mobile device to the first tower,
   identifying the second signal delay path includes identifying a second travel time for the signal traveling from the mobile device to the second tower, and
   determining whether the difference between the first signal delay path and the second signal delay path exceeds the threshold includes determining whether a difference between the first travel time and the second travel time is greater than a predetermined time threshold.

4. The method of claim 1, wherein the first and second towers are eNodeB towers associated with a Long-Term Evolution ("LTE") network and share a common receiver.

5. The method of claim 1, wherein the threshold includes 1 km.

6. The method of claim 1, wherein the threshold includes 4.7 µseconds.

7. The method of claim 1, further comprising:
   receiving from the first tower a time the first tower expects to receive a signal from the mobile device and a first propagation time delay associated with receiving the signal from the mobile device at the first tower; and
   receiving from the second tower a time the second tower expects to receive the signal from the mobile device and a second propagation time delay associated with receiving the signal from the mobile device at the second tower, wherein:
   identifying the first signal delay path includes identifying the first propagation time delay received from the first tower,
   identifying the second signal delay path includes identifying the second propagation time delay received from the second tower,
   determining whether the difference between the first signal delay path and the second signal delay path exceeds the threshold, includes determining whether the difference between the first propagation time delay and the second propagation time delay exceeds the threshold, and
   transmitting two streams of a same signal includes transmitting two streams of the same signal upon determining the difference between the first propagation time delay and the second propagation time delay exceeds the threshold.

8. The method of claim 7, wherein:
   the first stream of the two streams of the same signal is transmitted at the first time in advance of the time the first tower expects the signal, the first time being advanced from the time the first tower expects the signal to account for the first propagation time delay, and
   the second stream of the two streams of the same signal is transmitted at the second time in advance of the time the second tower expects the signal, the second time being advanced from the time the second tower expects the signal to account for the second propagation time delay.

9. The method of claim 7, wherein:
   the first stream of the two streams of the same signal is transmitted at the first time, the first time being advanced from the time the first tower expects the signal to account for the first propagation time delay, and
   the second stream of the two streams of the same signal is transmitted at the second time, the second time being advanced from the first time by the difference between the first propagation time delay and the second propagation time delay.

10. The method of claim 1, further comprising:
    receiving from the first tower a time the first tower expects to receive a signal from the mobile device and a first location associated with the first tower, and
    receiving from the second tower a time the second tower expects to receive the signal from the mobile device and a second location associated with the second tower, wherein:

identifying the first signal delay path includes identifying a first distance between the mobile device and the first tower based on the location of the mobile device and the first location of the first tower, identifying the second signal delay path includes identifying a second distance between the mobile device and the second tower based on the location of the mobile device and the second location of the first tower, determining whether the difference between the first signal delay path and the second signal delay path exceeds the threshold, includes determining whether the difference between the first distance and the second distance exceeds the threshold, and transmitting two streams of the same signal includes transmitting two streams of the same signal upon determining the difference between the first distance and the second distance exceeds the threshold.

11. The method of claim 10, wherein:

the first stream of the two streams of the same signal is transmitted at the first time, the first time being advanced from the time the first tower expects the signal to account for a time needed for the signal to travel the first distance, and the second stream of the two streams of the same signal is transmitted at the second time, the second time being advanced from the first time by a time needed for the signal to travel a distance corresponding to the difference between the first distance and the second distance.

12. The method of claim 1, wherein the second stream of the two streams of the same signal is transmitted at the second time in advance of the first time such that the two streams arrive at the receiver at substantially a same time.

13. The method of claim 1, wherein the first stream of the two streams of the same signal is transmitted in advance of a time the first tower expects to receive the signal to account for a propagation time delay between the mobile device and the first tower.

14. The method of claim 1, wherein the second stream of the two streams of the same signal is transmitted at the second time in advance of the first time such that the two streams arrived at a receiver within a network threshold time.

15. The method of claim 1, wherein the second stream of the two streams of the same signal is transmitted at the second time advanced from the first time by a time associated with the difference between the first signal delay path and the second signal delay path.

16. A method comprising:

identifying, at a mobile device, a first signal delay path to a first tower;

identifying, at the mobile device, a second signal delay path to a second tower;

determining, at the mobile device, a difference between the first signal delay path and the second signal delay path;

determining, at the mobile device, whether the difference between the first signal delay path and the second signal delay path exceeds a threshold; and upon determining the difference between the first signal delay path and the second signal delay path exceeds the threshold, determining whether a battery level associated with the mobile device is less than a threshold level; and upon determining the battery level associated with the mobile device is less than the threshold level, transmitting a radio frequency signal from the mobile device to a network at a time offset from an original time for transmitting the radio frequency signal.

17. The method of claim 16, wherein:

the original time corresponds to a first timing advance provided by the network informing the mobile device to transmit the radio frequency signal in advance of a time the network expects to receive the radio frequency signal to account for a first propagation time delay associated with the signal traveling from the mobile device to the first tower.

18. The method of claim 17, wherein the time offset is between the original time and a second time advance provided by the network informing the mobile device to transmit the radio frequency signal in advance of the time the network expects to receive the radio frequency signal to account for a second propagation time delay associated with the signal traveling from the mobile device to the second tower.

19. The method of claim 16, wherein:

identifying the first signal delay path includes identifying a first travel time for a signal traveling from the mobile device to the first tower, identifying the second signal delay path includes identifying a second travel time for the signal traveling from the mobile device to the second tower, and determining whether the difference between the first signal delay path and the second signal delay path exceeds the threshold includes determining whether a difference between the first travel time and the second travel time is greater than a predetermined travel threshold.

20. The method of claim 16, further comprising:

measuring an uplink performance associated with the signal transmitted from the mobile device to the network;

determining whether the uplink performance is within an acceptable threshold; and upon determining that the uplink performance is not within the acceptable threshold, adjusting the time offset from the original time to improve the uplink performance.

\* \* \* \* \*